(12) United States Patent
Zheng

(10) Patent No.: US 6,838,203 B2
(45) Date of Patent: Jan. 4, 2005

(54) MONOLITHIC FUEL CELL AND METHOD OF MANUFACTURE OF SAME

(76) Inventor: Yongjian Zheng, 31 S. Ashby Ave., Livingston, NJ (US) 07039

(*) Notice: Subject to any disclaimer, the term of this patent is extended or adjusted under 35 U.S.C. 154(b) by 182 days.

(21) Appl. No.: 10/174,686

(22) Filed: Jun. 19, 2002

(65) Prior Publication Data

US 2003/0235738 A1 Dec. 25, 2003

(51) Int. Cl.⁷ ............................................... H01M 8/10
(52) U.S. Cl. .............................. 429/31; 429/32; 429/34; 429/40
(58) Field of Search .............................. 429/31, 32, 34, 429/40

(56) References Cited

U.S. PATENT DOCUMENTS

| | | | |
|---|---|---|---|
| 4,499,663 A | | 2/1985 | Zwick et al. |
| 4,799,936 A | | 1/1989 | Riley |
| 5,290,642 A | * | 3/1994 | Minh et al. .................. 429/33 |
| 5,330,859 A | | 7/1994 | McPheeters et al. |
| 5,770,326 A | * | 6/1998 | Limaye ........................ 429/30 |
| 5,980,813 A | | 11/1999 | Narang et al. |
| 6,312,846 B1 | | 11/2001 | Marsh |
| 2002/0150804 A1 | * | 10/2002 | Srinivasan et al. ........... 429/32 |

* cited by examiner

*Primary Examiner*—Dah-Wei Yuan
(74) *Attorney, Agent, or Firm*—Myers & Kaplan, LLC; Thomas R. Williamson, III (57) ABSTRACT

A monolithic fuel cell is described which is made up of fuel passages and oxidizer passages, in the form of a monolithic block. The monolith is made from triplex layers of anode-electrolyte-cathode and a multifunctional substrate that provides interconnects between triplex layers, provides for gas diffusion and allows waste products to flow out through it to be extracted. Additionally, it provides current take-off where desired. The monolith may be a cube, a rectangular prism or a solid cylinder, made of layers of different materials with different design patterns. Also detailed is a low cost, high-speed fabrication method for manufacture of a monolithic block of fuel cells, using computer-aided design/computer-aided manufacturing to send instructions to a process management controller. The controller selects materials and defines their preparation and then sends these materials to robotic fabrication stations, which are also programmed by the controller. In this manner, sequential layers of material are applied to a substrate in a continuous process until a complete three-dimensional monolithic fuel cell is formed.

32 Claims, 4 Drawing Sheets

Fig. 1A

PEMFC/DMFC

SOFC

MONOLITHIC FUEL CELL AND METHOD OF MANUFACTURE OF SAME

CROSS-REFERENCES TO RELATED APPLICATIONS

Not Applicable

FEDERALLY SPONSORED RESEARCH

Not Applicable

SEQUENCE LISTING, TABLE OR COMPUTER PROGRAM

Not Applicable

FIELD OF THE INVENTION

The present invention is directed to the design and manufacture of fuel cells, more particularly to the design and manufacture of proton exchange membrane (including direct methanol) and solid oxide fuel cells.

BACKGROUND OF THE INVENTION

The ability to supply energy is of paramount importance to nearly all daily activities: Transportation, communications, manufacturing, provision of services, agriculture, all of these require energy. In addition to the supplying of energy, it is necessary that the energy be delivered at a rapid enough rate for the given application. This is power.

As more and more energy has been needed for the above applications, the sources, the raw materials so to speak, of many easy-to-use energy forms have been dwindling. Many sources are non-renewable, such as those based on fossil fuels, such as coal and oil. Additionally, these energy sources are also needed as raw materials, not for energy, but for manufacture of goods. Petrochemicals, such as plastics, are prevalent in today's world, but they take away from the sources of energy. An additional limitation on the use of fossil fuels for energy sources by conventional means, is that most technologies depend upon combustion of the fuel, and combustion reactions are limited by the Carnot cycle to about 30% efficiency.

Other raw materials, such as radioisotopes are abundant and could provide for energy needs for long into the future, but are less easy to use. Self-sustaining reactions such as fusion are extremely difficult to achieve and to manage once achieved.

Although man has gradually turned more and more toward renewable resources, many of the old mainstays are chosen to be used in different form. Often these are to some extent renewable. Hydrogen is the principal component of hydrocarbon fuels and is usable in different forms. As fossil fuels, it is limited. However, of particular importance, hydrogen is a component of alcohols, which are derived on a renewable basis from plant sources.

While hydrogen is plentiful as a component of water, the energy required to obtain it is greater than that which it will later release. In such cases, it is economical only to generate hydrogen using high efficiency power sources. However, hydrogen is highly suitable for providing energy in areas that do not have an energy source and, as such, serve to move the energy from where it is generated to where it is needed, in much the same way that power lines move electrical energy from the source generating plant to the end user.

As mankind has progressed, much of life takes place in a mobile fashion. Transportation is critical, but so is the ability to carry along portable sources of energy, such as batteries and fuel cells. Heretofore, batteries have been the choice. Often these are single use, basically carrying their energy with them in the form of chemical compounds. Other batteries are rechargeable, but these require a source of electrical energy to be recharged.

Most batteries are of the type that requires both a fuel and an oxidizer to be carried around. More recently some battery types, similar to fuel cells, have come to the foreground that carry only the fuel and use the air around them as the oxidizer.

Fuel cells, on the other hand, can provide electrical energy and can be recharged by use of chemical fuels that contain hydrogen. Fuel cells require a fuel to be provided, but use the surrounding air as their oxidizer. The byproducts of reaction in the fuel cell are predominantly water, and must be removed from the cell to keep it operating. (While the use of fuel in a fuel cell is often described as "burning", it is an electrochemical reaction and is not related to combustion. Thus, fuel cell efficiency is not limited by the Carnot cycle.) Fuel can be continuously fed without downtime, such as that required to change batteries. Additionally, the fuel source for fuel cells are typically much less expensive than the materials that provide the energy source in batteries.

Fuel cells can be made in small or large configurations. The larger designs are typically used as stationary energy sources, while the smaller ones are suited to portable applications. Some fuel cells are used in remote locations, where the fuel is brought to them periodically, but where they continue to provide electrical energy constantly.

There are several different types of fuel cells. The more important ones for the present invention are proton exchange membrane fuel cells (PEMFC), direct methanol fuel cells (DMFC), and solid oxide (SOFC) fuel cells. The technologies vary in different designs, different materials used for electrolyte/anode/cathode, different fabrication processes, different operating parameters, including fuels and operating temperatures, and are suited for different applications.

At the present time, the manufacture of fuel cells takes place by making individual cells and then incorporating these cells into a stack of cells to provide the surface area necessary to provide adequate power to the utilizing device.

The present invention describes fuel cells of the PEMFC/DMFC and SOFC types and details methods of manufacture that relate to PEMFC/DMFC and SOFC technologies in particular, but which may also be suitable for other types of fuel cell systems. Furthermore, the present invention allows for the manufacture of a multiplicity of cells together in a single solid unit.

Various techniques are presently used to make fuel cells. Typically, these rely on making fuel cells units and then putting them together into stacks to increase the voltage or current to that which is required for the application. One recent technology that may be used is that of rapid prototyping. Rapid prototyping is the name given to a methodology that uses different technologies to take a computerized design and make a three-dimensional physical model. Models made by rapid prototyping are often used in design testing, to make tooling, or in a few applications, to make products for sale.

In rapid prototyping, a design is generated and then computer processing is used to cut the design into thin slices, much like a microtome cuts tissue samples. These thin slices, typically 0.1 mm and thinner, are then laid down to build the three-dimensional form, by use of various processes and materials in succession to build up layers until a sold three-dimensional object is fully constructed.

A very important feature of rapid prototyping is that it is an "additive" process. Additive processes are much less material intensive than subtractive processes. Thus, additive processes are typically less costly and produce less waste. Additionally, through rapid prototyping, selective processes may be incorporated that only are applied to a given area of the article being manufactured.

An example of a subtractive process is the etching of copper-clad electronic circuit boards, which begin as a solid sheet of copper on a substrate. By coating with a photo resist, and then exposing to a pattern, the pattern is transferred to the copper. Areas that are not part of the pattern do not have photo resist that is cured on them and they can then be removed by etchant. The cost of lost copper is significant. A corresponding additive process from the same industry is one in which copper is deposited selectively in the form of the pattern on the circuit board substrate. In this fashion, only the necessary copper is "added", with essentially no waste.

While rapid prototyping is usually used for making solid mockups, it has rarely been used for production articles.

As computerized manufacturing becomes more sophisticated, it ahs become possible to utilize rapid prototyping, particularly where the size of the component to be made is small. Such a suitable product is a micro fuel cell.

The present invention utilizes the concept of rapid prototyping and takes it a step further to fabricate fuel cells in production quantities that are ready to use and do not have to be assembled from a stack of individual planar cells.

DESCRIPTION OF RELATED ART

U.S. Pat. No. 6,312,846 B1 to Marsh teaches the forming of a fuel cell on a semiconductor wafer by etching a channel in the wafer and forming a PEM barrier in the etched channel. While Marsh suggests this methodology for manufacture of micro fuel cells, the barrier that is formed must be extremely thin in order to function and thus would be fabricated into a tall narrow separating section. When made thus by the Marsh teachings this section will be extremely fragile in micro-sized fuel cells. Because of this, the Marsh methodology will be limited to applications that are not susceptible to shock and vibration. Additionally, the technology of Marsh is geared to PEMFCs and due to the use of polymers would not be suitable for higher temperature systems such as SOFCs. Marsh requires that in order to build up an adequate thickness, many applications of the same material are needed to form a single layer, which is highly inefficient.

U.S. Pat. No. 5,980,813 to Narang et al. teaches the use of rapid prototyping techniques using multiple materials to form three-dimensional objects layer by layer. Narang et al. teaches the use of a specific material containing a metal having a covalent bond to a non-metal, thus forming a general three-dimensional object through a chemical reaction, which alters the covalent bond of the metal. Thus, technique of Narang strongly depends on this special material and the chemical reaction to form a three-dimensional object layer by layer. These two requirements restrict the application of the Narang technique because many other different materials, which do not fulfill Narang's two requirements, are needed to make a fuel cell. Besides, Narang is limited to selective photo expose as the way to harden the build material. There are many other selective deposition techniques that may be used with the present invention. U.S. Pat. No. 4,799,936 to Riley teaches using microwave and conventional heating to remove a binder at a lower temperature followed by sintering the oxide at a higher temperature to form the fuel cell. The advantages cited by Riley are a reduction in time and power, along with the elimination of large temperature gradients within the oxide material. Additionally, it reduces the problems of internal cracking, separation of components, blistering and delamination. While the Riley teachings are suitable for the most part to the present invention, and are incorporated herein by reference, it does not teach the use of laser sintering to form the layers.

U.S. Pat. No. 5,330,859 to McPheeters et al. teaches a monolithic design made up of stacks of composites formed by tape casting or hot roll calendering. McPheeters et al. teach away from a tubular design in spite of excellent performance of such cells, due to the complexity of manufacture, which requires deposition on the inside surface of a tube, and which McPheeters et al. state must be done using electrochemical vapor deposition (ECVD). McPheeters et al. also teach away from a tubular design due to uncertainties regarding the reliability of individual cells in a system. These same objections by McPheeters would apply to all systems that are made in a tubular fashion, whether round or prismatic. McPheeters specifies a SOFC that is constructed of two material components in a planar design and which is limited in the materials that may be used.

U.S. Pat. No. 4,499,663 to Zwick et al. teaches "building up the electrolyte and interconnect walls" by depositing each material on individually and endwise of the wall itself, where each material deposit is sequentially applied for one cycle; and where the deposition cycle is repeated may times until the material buildup is sufficient to formulate the core. The core is heat cured to become dimensionally and structurally stable. The Zwick method is overly complicated for the fabrication of the designs of the present invention, particularly in the need to deposit layers in complex shapes. It also has a weaker and less stable structure than the present invention.

U.S. Pat. No. 5,770,326 to Limaye teaches a monolithic cell, such as an SOFC, fabricated as a single unit block of electrolyte material, such as yttria-stabilized zirconia (YSZ) for an SOFC fuel cell, with many flow channels for fuel and air, which is then coated with anode and cathode materials. Electrolyte is one of the more expensive materials used in making fuel cells and the Limaye technique would be very costly, especially for PEMFC, because the electrolyte mostly used here is Nafion™, which is available from DuPont Corporation, Wilmington, Del., and which is relatively expensive. The Limaye approach also requires coating on the inside, which according to the teachings of Riley is not simple or reliable. Further Limaye teaches the use of injection molding, gel casting, slurry setting and hot pressing. The advantage of Limaye's monolithic cell is that thermal incompatibilities are reduced. The Limaye monolithic design is made from electrolyte materials with flow channels for fuel and air, rather than having the fuel and air channels in the solid SIGF design, as described in the present invention. The method of fabricating the electrode layers, by coating and deposition, is more involved than the present invention. Beside all above-mentioned problems and challenges, fuel cell developers are also facing the problem of how to find compatible materials for all the functions of the fuel cell and how to use them efficiently. Most current designs of planar SOFCs, for instance, apply either nickel-doped, yttria-stabilized zirconia (Ni/YSZ; anode supported), or lanthanum strontium manganese trioxide (LSM; cathode supported) as a substrate to deposit a thin YSZ (electrolyte) film on it. In addition, these designs also need interconnect layers to provide electrical contact between the individual cells so they may be connected together in series to produce a suitable voltage. Such designs have several deficiencies, including high operating temperature (because of the thick anode or cathode layers), high use of expensive materials (mostly of Ni/YSZ or LSM, which are also used as the substrates), high fabrication cost, poor system integration and heavy fuel cell stacks. In particular, the use of Ni/YSZ as the structural support has a number of drawbacks, including the high cost of the subsequent thick Ni/YSZ electrodes, and the need to maintain a reducing atmosphere on stack cool-down to avoid oxidation of the Ni to NiO. Only by integrating the substrate layer with the interconnect layer can these deficiencies be overcome.

OBJECTS AND ADVANTAGES

It is an object of the present invention to provide a design for a monolithic fuel cell, which is made as a single unit rather than being assembled from stacks of component fuel cells.

It is another object of the present invention to provide a fuel cell in which the substrate, interconnects, gas diffusion and flow field layers are all comprised of one material.

It is a further object of the present invention to provide a fast, quick and efficient method of manufacture for three-dimensional monolithic fuel cells containing many layers of different materials.

An additional object of the present invention to provide a method of manufacture of solid many-layered objects suitable for fuel cells.

It is a further object of the present invention to apply layered manufacturing technologies, such as rapid prototyping, to the fabrication or manufacture of fuel cells and fuel cell objects.

It is yet another object of the present invention to provide a complete system for fuel cell modeling, design, simulation, fabrication, and testing, all coordinated into a single overall process. This process provides for automated transfer of digital three-dimensional fuel cell models and designs, into physical three-dimensional fuel cell objects (three-dimensional cubes or other shapes made of multi-layered materials, such as plastics or ceramics, used for anodes, electrolyte, cathodes, interconnects, and insulators). This provides both flexibility of operation, but also because of the techniques and materials used, there is strength with physical flexibility as well.

A feature of the present invention is that it is simple in operation and may be used for a variety of different fuel cell technologies. It is not limited to fuel cell materials that are only suitable under specific environmental conditions, such as modest temperature.

Another feature is that the present technology can be made in different complicated patterns and designs for different needs or applications.

A further object of the present invention is to delineate a digital fabrication system and designs of fuel cells, with key advantages that include design flexibility, easy fabrication, less and efficient usage of expensive materials (electrolyte and electrodes), rapid prototyping, manufacturing and testing, and high performance.

By reviewing and considering the drawings and descriptions further objects and advantages of the instant invention will be apparent.

BRIEF SUMMARY OF THE INVENTION

The present invention describes a fuel cell that utilizes a triplex set of layers for the anode-electrolyte-cathode, which is separated from a single unit, possibly of a single material, component (SIGF) that incorporates a substrate, an interconnect between the successive triplex layers which also may serve as a contact for external electrical connection, gas diffusion and flow field for removal of by-products. By incorporating these four functions into a single construct, great economies are achieved. This is particularly so when the SIGF is made of a single material.

The present invention succeeds in overcoming the deficiencies of the prior art. A monolithic block is fabricated by rapid prototyping techniques that have been adapted to full-scale manufacturing. What is achieved is a monolithic fuel cell core/device, with a plurality of fuel passages and oxidizer passages, in the shape of a cube, a rectangular prism or a solid cylinder.

Furthermore, the present system allows for low cost, high speed fabrication of monolithic block fuel cells, through the use of computer-aided design and manufacturing, through a control system that prepares and provides raw materials to final fabrication by robotic stations that lay down different layers of material on a substrate in a continuous process, creating a complete three-dimensional monolithic fuel cell.

DETAILED DESCRIPTION OF THE INVENTION

Figure 1A:
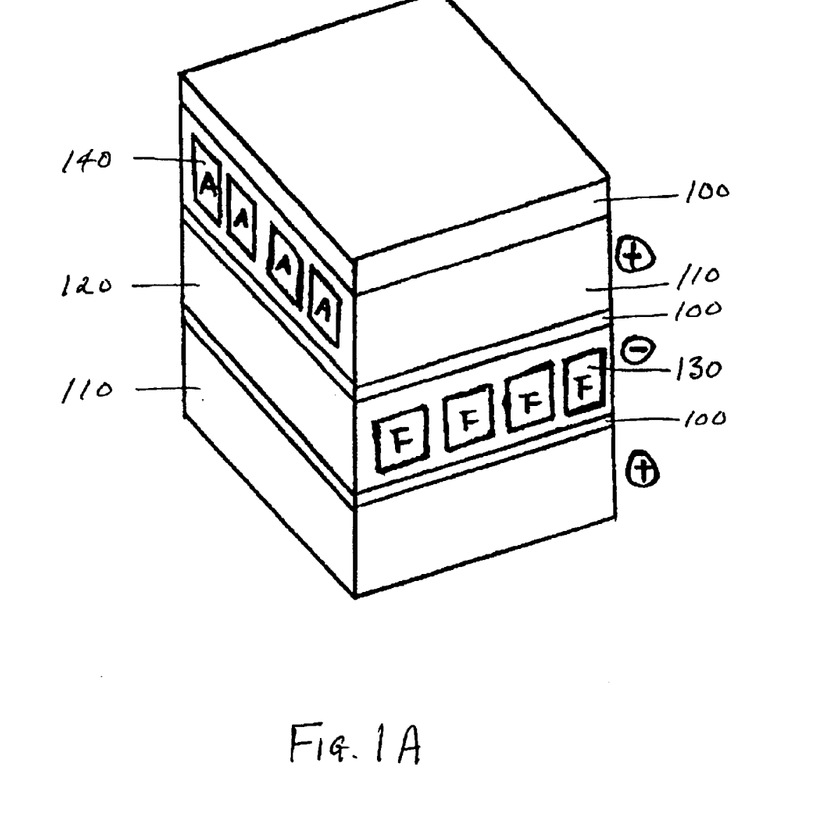
FIG. 1A depicts a fuel cell core of the present invention in perspective view.

The monolithic fuel cell core is shown in perspective view in FIG. 1A. This monolithic block is made up of sequential triplex layers 100 of electrode/electrolyte components. These are separated from one another by the substrate, interconnect, gas diffusion and flow field (SIGF) layer, which may be made up of a single material. The SIGF thickness range is typically between about 900 and approximately 2700 $\mu$m. The triplex layer is made from an anode layer, a cathode layer and a layer of electrolyte. The triplex layer has a total thickness ranging from about 13 to about 55 $\mu$m. The anode thickness range is typically between approximately 5 and about 20 $\mu$m, the cathode thickness range is also between approximately 5 and about 20 $\mu$m, and the electrolyte thickness ranges from about 3 to approximately 15 $\mu$m.

There is an SIGF layer for oxidizer 110 and an SIGF layer for fuel 120. The SIGF layers for fuel 120 and oxidizer 110 are made from a single material. Within each layer, is a channel or passage that is typically between 300 and 900 $\mu$m square, although other geometrical shapes are also suitable, such as a rectangular prism or a cylinder, and the thickness of material surrounding it is between 300 and 900 $\mu$m.

Fuel flows through the fuel flow channels 130 in the SIGF layer for fuel 110. Correspondingly, oxidizer, such as air, flows through the oxidizer flow channels 140 in the SIGF layer for oxidizer 110. This pattern of fuel and oxidizer repeats in a number of layers selected in design to meet the voltage needs of the application. By repeating the triplex layers 100 of anode, electrolyte, cathode, and alternating SIGF layers for fuel 120 and oxidizer 110, a composite fuel cell core is made in a monolithic block in a single operation.

The SIGF layers and the triplex layers are laid down one on top of the other by a suitable deposition manufacturing process. A base material of any suitable solid non-conductive material may be used for starting the deposition. As each layer of material is applied, it may be dried or selectively cured or sintered in order to create an appropriate pattern for functionality as an anode, cathode, etc. When the next layer is applied on top of it, the functional surfaces are complete.

Figure 1B:
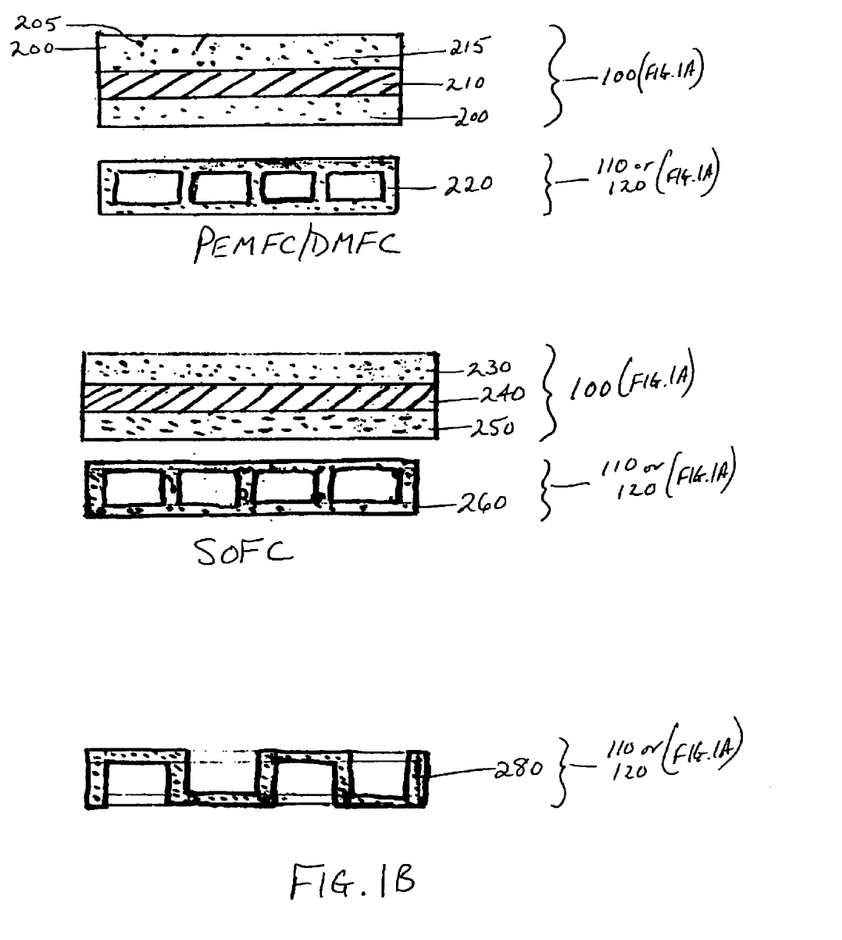
FIG. 1B shows a cross-section of groups of layers of the fuel cell for both a PEMFC/DMFC and a SOFC core.

In FIG. 1B, detail of the anode, electrolyte, and cathode sub-layer is shown for both a PEMFC/DMFC and an SOFC construction. For the PEMFC/DMFC version, the anode 200 and cathode 201 are made from a porous conductive polymer doped with nano particles of carbon 205 and a platinum alloy catalyst 215. For optimum performance, the carbon should be 10 nm and the platinum should be 2 nm in size. The electrolyte is made from a proton conductive polymer. The conductive polymer selected here is polypropylene. The SIGF layer 220 for the PEMFC/DMFC fuel cell is made from graphite and a porous conductive polymer, such as polypropylene, using terpineol as a solvent.

For the case of SOFC, the anode is made from nickel-doped yttria-stabilized zirconia powder with ethyl cellulose as binder and terpineol for a solvent. The electrolyte is made from yttria-stabilized zirconia powder, ethyl cellulose and terpineol. The cathode is made from lanthanum strontium manganese trioxide powder, again bound with ethyl cellulose and using terpineol as a solvent. For the SIGF layer, the SOFC utilizes Inconel™ yttria-stabilized zirconia powder bound with ethyl cellulose and using terpineol as a solvent.

The table below is a detail description of the materials used to make a paste or slurry to form the triplex layer, the electrode layers, and the electrolyte layers as well, for PEMFC/DMFC and SOFC.

TABLE I

| | | PEMFC/DMFC | SOFC |
|---|---|---|---|
| SIGF | POWDER | GRAPHITE | INCONEL/YSZ |
| | BINDER | POLYPROPYLENE | ETHYL CELLULOSE |
| | SOLVENT/PLASTICIZER | TERPINEOL | TERPINEOL |
| ANODE | POWDER | CARBON, PLATINUM | Ni/YSZ |
| | BINDER | POLYPROPYLENE | ETHYL CELLULOSE |
| | SOLVENT/PLASTICIZER | TERPINEOL | TERPINEOL |
| ELECTROLYTE | POWDER | | YSZ |
| | BINDER | NAFION ™ SOLUTION | ETHYL CELLULOSE |
| | SOLVENT/PLASTICIZER | | TERPINEOL |
| CATHODE | POWDER | CARBON, PLATINUM | LSM |
| | BINDER | POLYPROPYLENE | ETHYL CELLULOSE |
| | SOLVENT/PLASTICIZER | TERPINEOL | TERPINEOL |

The paste or slurry is made by mixing a solvent/plasticizer, binder and powders in a typical ratio of 70 weight percent powder to 30 weight percent of organics, determined by the individual layer. This approximates a ratio of 40 volume for powder to 60 volume percent for organics. The paste or slurry is homogenized by an ultrasonic disperser, before it can be applied or deposited. Typically, the solvents/plasticizers may be selected from terpineol, water, ethylene glycol, diethylene glycol, tetraethylene glycol, poly(ethylene glycol), glycerine, dimethyl phthalate, dibutyl phthalate, octyl phthalate, benzyl butyl phthalate, or diethyloxalate. Binders other than Nafion™ may be selected from ethyl cellulose, polyvinyl butyral, methacrylate solution, methacrylate emulsion, ammonium polyacrylate, alginates, or gums.

To form the triplex layer, between the anode and the cathode there is located the electrolyte layer 210, which for the case of a PEMFC/DMFC is a proton exchange polymer membrane, typically of Nafion™ in a thickness range of 10 to 200.

The other layer in the PEMFC/DMFC version of the fuel cell is the SIGF 220, which is made from a porous, conductive polymer, such as polypropylene, doped with graphite for conductivity.

The various component layers of the triplex layer are applied to the SIGF fuel or oxidizer layer by casting, spreading, screen printing or spraying, such that the fuel SIGF will have an anode applied above and below it, and the oxidizer SIGF will have a cathode applied above and below.

The SIGF layer itself is made from a paste or slurry by using techniques such as injection molding, hot extrusion, and hot pressing, to achieve different design patterns of the SIGF. It can be also made by deposition from a paste or slurry in layers 300 to 900 $\mu$m thick. The deposited material is then selectively dried and hardened at 60° C. to achieve the different design patterns of the SIGF.

Similarly, for the SOFC version, also shown in FIG. 1B, there is an anode 230, a cathode 250 and an electrolyte 240, which combine to form the triplex layer. The cathode is made of LSM, a solvent and a binder (as described in the above table), and performs best in a range of thickness between 15 and 20 $\mu$m. The anode is made of nickel-doped, yttria-stabilized zirconia (Ni—YSZ), again made with a binder and solvent (as explained in the above table), which is also optimum between 15 and 20 $\mu$m in thickness. Between the anode and the cathode, there is a layer of yttria-stabilized zirconia (YSZ) electrolyte, also from a mixture with a binder and solvent (as explained in the above table), which performs best at a range of 3 to 10 $\mu$m. Terpineol is a suitable solvent/plasticizer for these applications. The binder selected for these applications is ethyl cellulose.

The SIGF 280 for the SOFC system utilizes a porous, high-strength commercial alloy, or a metal-ceramic material in the range of thickness from 900 to 2700 $\mu$m. An alloy such as Inconel™, available from International Nickel Company, is suitable, as are the metal-ceramic materials such as $Al_2O_3$, YSZ, calcia-stabilized zirconia (CSZ), and MgO. Similarly, the paste or slurry for the SIGF is made by mixing a solvent/plasticizer, binder and powders. The paste or slurry is then homogenized by an ultrasonic disperser, before it can be used to make the SIGF layer with different design patterns, by using techniques such as injection molding, hot extrusion, and hot pressing.

Another technique to make the SIGF for the SOFC of the present invention is to use Selective Laser Sintering (SLS) or Selective Laser Curing to form the patterned SIGF directly from Inconel/YSZ powder, layer by layer, without use of any binder/plasticizer, or solvent. This technique uses a laser beam to selectively fuse powdered materials, such as Inconel/YSZ, into a solid object at temperatures between 800° C. and 900° C. A laser traces the pattern of the first layer, sintering it together. The Inconel/YSZ powder is then reapplied to form a new layer above the previously sintered layer and the laser beam again traces the pattern of this layer to selectively fuse the Inconel/YSZ powder. This process continues until the whole SIGF with any complicated design pattern is sintered and formed completely.

Finally, there is shown in FIG. 1B an alternative shape for the SIGF 280, which utilizes less material and which would yield a lighter fuel cell.

Figure 2:
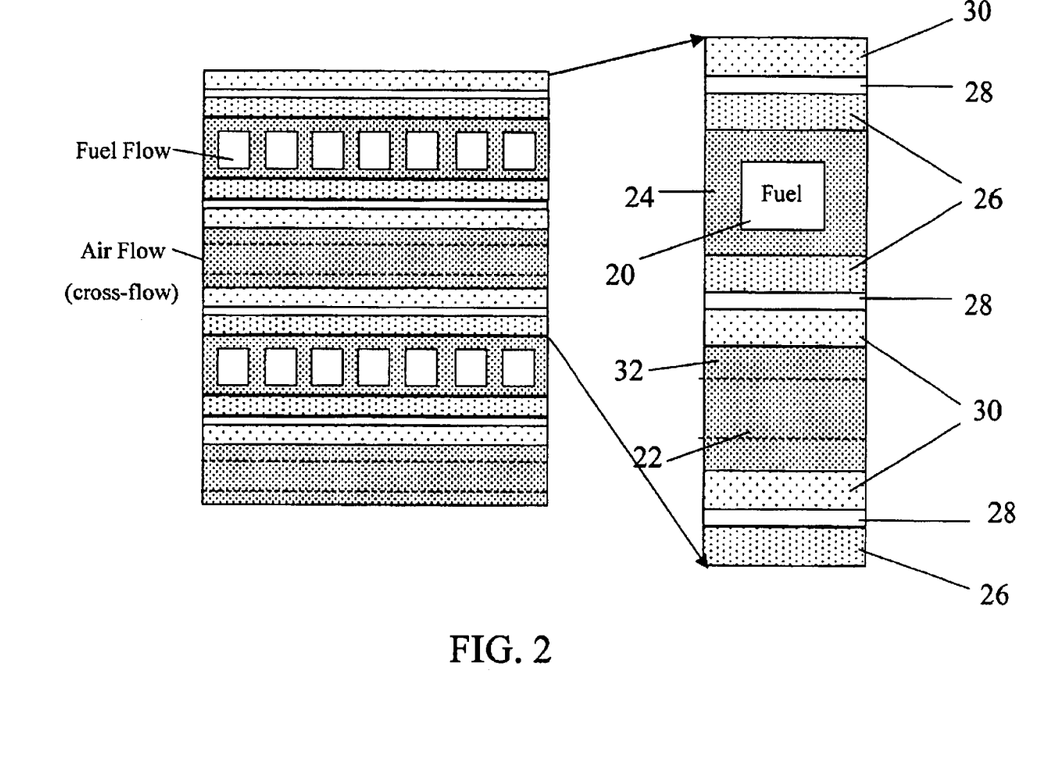
FIG. 2 illustrates by cross-sectional view, a PEMFC/DMFC or SOFC core.

FIG. 2 shows the details of the fuel cell by breakout section. Fuel and air flow into the fuel cell through passageways 20, 22 created during the manufacturing process. Surrounding the fuel passageway 20 is the fuel side porous substrate 24, which serves as the structure for the passageway and also as the negative electrode current collector. Adjacent to the fuel side porous substrate 24, are the porous anodes 26 of the fuel cell. At these anodes, fuel is oxidized providing electrons to the fuel side porous substrate 24, where they are collected and carried away to power the utilizing device.

On the other side of the porous anodes 26 from the fuel side porous substrate 24, is a dense electrolyte 28. This dense electrolyte 28 permits ionic transfer between the porous anodes 26 and the porous cathodes 30, which are located on the opposite side of the dense electrolyte 28 from the porous anodes 26.

Next to the porous cathodes 30, on the side away from the dense electrolyte 28, is the air side porous substrate 32, which serves to provide structure to the air passageway 22 and also to collect current by providing a return path for electrons that have travelled through and powered the utilizing device.

In operation, fuel enters the fuel passageway and air enters the air passageway. Fuel is oxidized at the porous anodes and air is reduced at the porous cathodes. Electrons from the anode flow to the fuel side porous substrate interconnect (current collector), to the next adjacent cell or out of the fuel cell to the external device which is being powered. The electrons then flow from the powered device to the air side porous substrate current collector surrounding the cathode and finally into the porous cathode, where they meet cations that have travelled through the ionically-conducting dense electrolyte. The cations have been generated at the porous anode when electrons have been stripped from the fuel. These cations flow through the dense electrolyte to the porous cathode, where they meet oxygen anions generated by electrons combining with oxygen in the air. Wastewater then passes through the porous cathode to the flow field for wastewater removal. At the same time the cations meet oxygen anions at the cathode, the same process is taking place at the anode, where oxygen anions that have migrated through the dense electrolyte are combined with cations generated at the anode. Once again, the wastewater passes out of the triplex system into the flow field through the porous nature of the anode.

Figure 3:
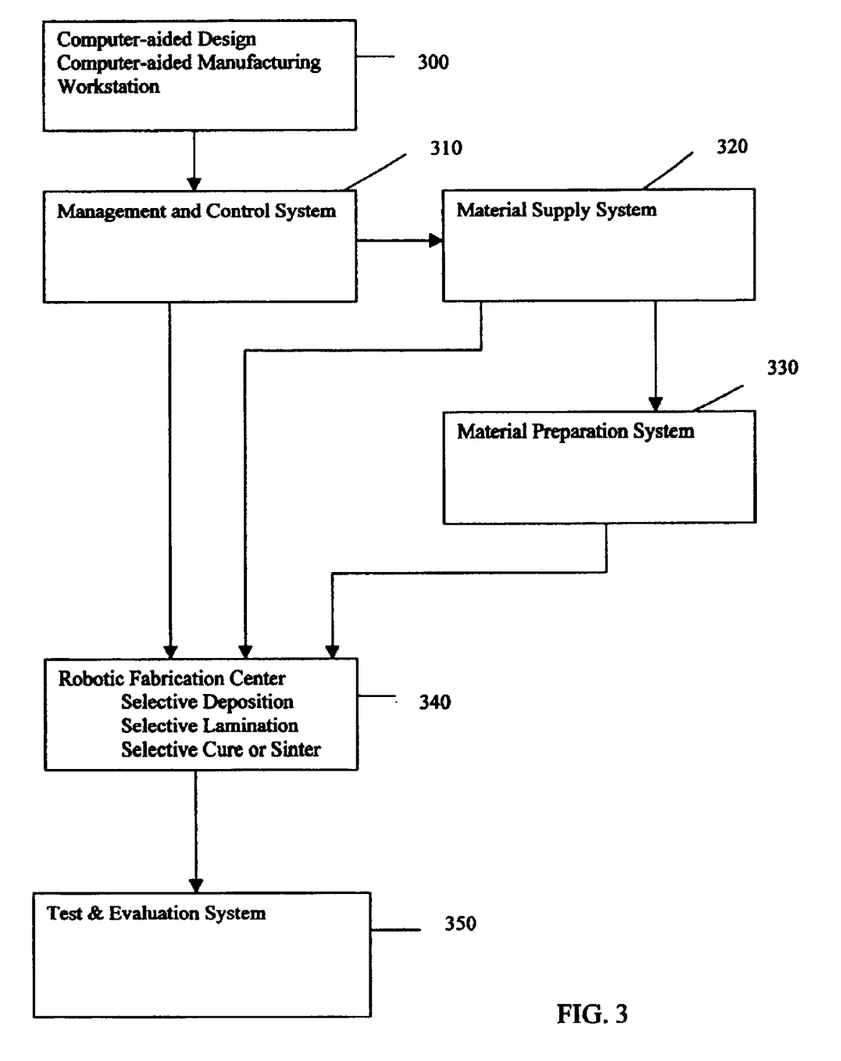
FIG. 3 depicts a process flow diagram of the digital manufacturing system of the present invention.

FIG. 3 is a process flow diagram showing the steps to manufacture a fuel cell of the present invention.

The process begins with design of the fuel cell at a computer workstation suitable for digital three-dimensional design, modeling, simulation, as well as computer-aided design/computer-aided manufacturing (CAD/CAM) 300.

Next, the management and control system 310 transfers a three-dimensional model into two-dimensional layers with different patterns, creates instructions for material supply 320 and preparation 330 to each layer, and creates fabrication instructions to make a physical three-dimensional fuel cell object layer by layer. This system next distributes the fabrication instructions to robotic fabrication center 340, and synchronizes the operation of these robot arms with the material supply system.

A material preparation 330 and supply 320 system prepares and makes starting materials (in the form of powders, slurries, pastes, tape-cast sheets, solids, liquids and/or vapors) for each layer, according to instructions from the management and control system 310.

At the robotic fabrication center 340, which has several robot stations and material supply rolls, each robot station is able to perform its operations through robotic arms. These operations include 1) selective thin film deposition, such as pressing, extrusion, spraying, printing, and injection), 2) selective lamination, and 3) selective curing and sintering. Based on the fabrication instructions, each robot arm will deposit one patterned layer of a certain specific material on a three-dimensional fuel cell object. Thus, manufacturing in layers carries out fabrication of the fuel cell.

Finally, there is a testing and evaluation station 350, which ensures the quality and operability of the fabricated fuel cells.

Traditionally, rapid prototyping has used liquids, such as photopolymers, powder sintering, sheet cutting, and filament fusing. One new method of rapid prototyping is through the use of pastes. Powders are combined with liquids and/or binders to make pastes or slurries. The paste or slurry that is produced must be homogenized using a suitable apparatus, such as an ultrasonic disperser, and can then be applied and processed. A variety of powder materials and liquids may be used, in particular for the present invention, metal ceramic materials. By this technique, a speed of processing closely approximating that for liquid processes can be achieved. Additionally, the quality of the part is generally improved due to the nature of liquid systems providing smooth surfaces due to their surface tension, which is not present in dry powders, which generally are processed to less smooth surfaces.

Pastes typically combine a liquid polymer, as those mentioned above, with a specific powder and are processed through the use of stereolithography, followed by ultraviolet polymerization. Other rapid prototyping techniques that are suitable for manufacture of fuel cells are stereolithography, ink-jet printing, selective laser sintering, fused deposition modeling, solid ground curing, three-dimensional printing and laminated object manufacturing. The liquid polymer selected typically comes from those resins used in rapid prototyping. Size distribution averages of less than 20 $\mu$m are typically chosen, with particle size less than 50 $\mu$m. The ratio of powder to liquid polymer is in the range of about 35–60%, with limits of 10% and 70%.

Pastes have the advantage that highly filled materials can be sintered; thus, they are particularly applicable to produce dense sintered ceramic or metallic parts. Pastes also allow higher fabrication speeds than are typical with other rapid prototyping techniques, and can produce very fine layers. The layer deposition speed does not depend on the thickness of the layers. There is no shrinkage of powder grains, and they have high geometric stability even above the glass transition temperature. They have high tensile and flexural moduli. Above all, powders can be selected for specific performance characteristics, and a mixture of powders can be made to achieve desired results.

By the same token, slurries may be used instead of pastes. Slurries would be more applicable for manufacture of thinner components.

After application of the paste, the liquid polymer is removed at a relatively low temperature of around 400–500° C. This step in the process can be lengthy, but may be shortened by the choice of the liquid polymer used. After removal of the polymer, the component undergoes sintering, carried out at much higher temperatures, usually in excess of 1200° C. This is a much shorter process. In some circumstances, it is necessary to provide a reducing atmosphere to prevent oxidation of the metal material. High power lasers can typically be used, which allows the manufacture of thick component parts.

The process of rapid prototyping using pastes is readily scaleable to extremely high fabrication speeds. This rapid prototyping process allows a multiple of steps to be combined into a single machine, allowing full material to final component rapid manufacturing.

In the manufacture of fuel cells of the present invention, the rapid prototyping steps are incorporated into the digital manufacturing process, which is shown in FIG. 3. By using the DFCMS one can design and build complicated three-dimensional fuel cell objects with different layers of materials and three-dimensional patterns, fabricating them layer by layer.

Conclusions, Ramifications, and Scope

The fuel cell of the present invention enables the manufacture through rapid means, monolithic fuel cells that have multiple layers of anode, electrolyte, cathode and substrate/interconnect/gas diffusion/flow field (SIGF) layers. In the case of each functional component of the fuel cell, the layer is made of a single material, facilitating manufacture and design.

While the invention has been described with reference to specific details and examples of the preferred embodiments, it will be understood by those skilled in the art that various changes may be made and equivalents may be substituted for elements thereof, without departing from the scope of the invention. In addition, many modifications may be made to adapt a particular situation or material to the teachings of this invention without departing from the essential scope thereof. Therefore, it is intended that the invention not be limited to the particular embodiments disclosed as the best mode contemplated for carrying out this invention, but that the invention will include all embodiments falling within the scope of the claims below and their legal equivalents.

I claim:

1. A monolithic fuel cell, comprising:
    a) a plurality of triplex anode layer-electrolyte layer-cathode layer sandwiches, said triplex sandwiches further comprising a plurality of anode layers, a plurality of cathode layers, and a plurality of electrolyte layers; and
    b) a plurality of substrate interconnect gas diffusion flow field layer constructs, further comprising a plurality of fuel passages and a plurality of oxidizer passages, said substrate interconnect gas diffusion flow field layer constructs comprising a substrate means for providing electrical interconnection between adjacent anode and cathode layers, providing gas diffusion, and providing a flow field for reaction by-products, said substrate interconnect gas diffusion flow field layer constructs being interposed between said anodes and cathodes and containing said fuel and oxidizer passages, wherein said anode layers and said cathode layers are made from a mixture comprising a porous conductive polymer doped with nano-scale catalyst and carbon particles.

2. The monolithic fuel cell of claim 1, wherein the shape of said monolithic fuel cell is selected from a group consisting of a cube, a rectangular prism and a solid cylinder.

3. The monolithic fuel cell of claim 1, wherein said substrate interconnect gas diffusion flow field layer constructs ate comprised of at least one material.

4. The monolithic fuel cell of claim 1, wherein said substrate interconnect gas diffusion flow field layer constructs comprise a porous metal ceramic material.

5. The monolithic fuel cell of claim 1, wherein said substrate interconnect gas diffusion flow field layer constructs are comprised of walls and channels within said walls.

6. The monolithic fuel cell of claim 1, wherein said catalyst is platinum of approximately 2 nm particle size.

7. The monolithic fuel cell of claim 1, wherein said carbon is approximately 10 nm particle size.

8. A monolithic fuel cell, comprising:
    a) a plurality of triplex anode layer-electrolyte layer-cathode layer sandwiches, said triplex sandwiches further comprising a plurality of anode layers, a plurality of cathode layers, and a plurality of electrolyte layers; and
    b) a plurality of substrate interconnect gas diffusion flow field layer constructs, further comprising a plurality of fuel passages and a plurality of oxidizer passages, said substrate interconnect gas diffusion flow field layer constructs comprising a substrate means for providing electrical interconnection between adjacent anode and cathode layers, providing gas diffusion, and providing a flow field for reaction by-products, said substrate interconnect gas diffusion flow field layer constructs being interposed between said anodes and cathodes and containing said fuel and oxidizer passages, wherein said substrate interconnect gas diffusion flow field layer constructs are comprised of a porous conductive polymer doped with graphite.

9. The monolithic fuel cell of claim 8, wherein said porous conductive polymer is polypropylene.

10. The monolithic fuel cell of claim 1, wherein said electrolyte layers are selected from a group consisting of proton conductive polymers and exchange polymers.

11. The monolithic fuel cell of claim 1, wherein said electrolyte layers comprise a perfluorinated polymer.

12. The monolithic fuel cell of claim 1, wherein said substrate interconnect gas diffusion flow field layer constructs are deposited from a slurry.

13. The monolithic fuel cell of claim 1, wherein said substrate interconnect gas diffusion flow field layer constructs are deposited by a pasting process.

14. The monolithic fuel cell of claim 1, wherein said cathode layers comprise lanthanum strontium manganese trioxide, a binder, and a solvent.

15. The monolithic fuel cell of claim 14, wherein said solvent is terpineol.

16. The monolithic fuel cell of claim 14, wherein said binder is ethyl cellulose.

17. The monolithic fuel cell of claim 1, wherein said anode layers comprise a powder mixture of nickel doped yttria-stabilized zirconia, a solvent, and a binder.

18. The monolithic fuel cell of claim 17, wherein said solvent is terpineol.

19. The monolithic fuel cell of claim 17, wherein said binder is ethyl cellulose.

20. The monolithic fuel cell of claim 1, wherein said electrolyte layers are comprised of yttria-stabilized zirconia, a solvent, and a binder.

21. The monolithic fuel cell of claim 20, wherein said solvent is terpineol.

22. The monolithic fuel cell of claim 20, wherein said binder is ethyl cellulose.

23. The monolithic fuel cell of claim 1, wherein said substrate interconnect gas diffusion flow field layers are comprised of a powdered material, a binder, and a solvent.

24. The monolithic fuel cell of claim 23, wherein said powdered material is selected from the group consisting of a mixture of a nickel-chromium alloy and yttria-stabilized zirconia, aluminum oxide, yttria-stabilized zirconia, calcia-stabilized zirconia and magnesium oxide.

25. The monolithic fuel cell of claim 1, wherein said substrate interconnect gas diffusion flow field layers are made by selective laser sintering.

26. The monolithic fuel cell of claim 25, wherein the substrate interconnect gas diffusion flow field layers are sintered at a temperature between approximately 800° C. and approximately 900° C.

27. The monolithic fuel cell of claim 1, wherein said substrate interconnect gas diffusion flow field layers are made by selective curing.

28. The monolithic fuel call of claim 1, further characterized by being fabricated from a manufacturing process selected from a group consisting of selective lamination, slurry pasting, selective thin film deposition, selective curing, and selective laser sintering.

29. The monolithic fuel cell of claim 28, wherein said selective thin film deposition is selected from the group consisting of pressing, extrusion, spraying, printing, and injection.

30. The monolithic fuel cell of claim 1, wherein said anode, electrolyte, cathode and substrate interconnect gas diffusion flow field layers comprise a powder mixture of metal ceramic compound, a solvent, and a binder.

31. The monolithic fuel cell of claim 30, wherein said solvent is selected from a group consisting of terpineol, water, ethylene glycol, diethylene glycol, tetraethylene glycol, poly(ethylene glycol), glycerine, dimethyl phthalate, dibutyl phthalate, octyl phthalate, benzyl butyl phthalate, and diethyloxalate.

32. The monolithic fuel cell of claim 30, wherein said binder is selected from a group consisting of ethyl cellulose, polyvinyl butyral, methacrylate solution, methacrylate emulsion, ammonium polyacrylate, alginates, and gums.

* * * * *